United States Patent
Lee (10) Patent No.: US 9,253,412 B2
(45) Date of Patent: Feb. 2, 2016

(54) CAMERA BRIGHTNESS CONTROL SYSTEM, MOBILE DEVICE HAVING THE SYSTEM, AND CAMERA BRIGHTNESS CONTROL METHOD

(71) Applicant: Samsung Electronics Co. Ltd., Suwon-si; Gyeonggi-do (KR)

(72) Inventor: Yonggu Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 131 days.

(21) Appl. No.: 13/935,912

(22) Filed: Jul. 5, 2013

(65) Prior Publication Data
US 2014/0009639 A1     Jan. 9, 2014

(30) Foreign Application Priority Data
Jul. 9, 2012  (KR) .................. 10-2012-0074342

(51) Int. Cl.
| | |
|---|---|
| H04N 5/235 | (2006.01) |
| H04N 5/232 | (2006.01) |
| G03B 7/08 | (2014.01) |
| G03B 17/18 | (2006.01) |

(52) U.S. Cl.
CPC .............. *H04N 5/2353* (2013.01); *G03B 7/08* (2013.01); *H04N 5/232* (2013.01); *H04N 5/2351* (2013.01); *G03B 17/18* (2013.01)

(58) Field of Classification Search
CPC .......... H04N 1/00835; H04N 1/00997; H04N 1/4005; H04N 5/58; H04N 5/235; H04N 5/2351; H04N 5/2354; H04N 5/351; H04N 2005/44517; H04N 5/57; H04N 9/77; H04N 21/4854
USPC .............. 348/227.1, 228.1, 229.1, 602, E5.12
See application file for complete search history.

(56) References Cited

U.S. PATENT DOCUMENTS

| | | | |
|---|---|---|---|
| 2005/0088567 A1* | 4/2005 | Kim .............................. | 348/370 |
| 2005/0206750 A1 | 9/2005 | Aoyagi et al. | |
| 2006/0262211 A1* | 11/2006 | Kido ............................. | 348/308 |
| 2007/0109431 A1* | 5/2007 | Lee ............................... | 348/254 |
| 2008/0074517 A1* | 3/2008 | Chung et al. .................. | 348/255 |
| 2009/0160976 A1* | 6/2009 | Chen et al. .................... | 348/234 |
| 2010/0141571 A1* | 6/2010 | Chiang et al. ................. | 345/102 |
| 2010/0157139 A1* | 6/2010 | Velarde et al. ................ | 348/366 |
| 2011/0186714 A1* | 8/2011 | Hung et al. ............. | 250/214 AL |
| 2012/0229704 A1* | 9/2012 | Suzuki .......................... | 348/554 |
| 2012/0327294 A1* | 12/2012 | Jaffrain et al. ................ | 348/366 |

FOREIGN PATENT DOCUMENTS

| | | |
|---|---|---|
| EP | 1133168 A2 | 9/2001 |
| EP | 2200306 A2 | 6/2010 |
| KR | 10-0672015 B1 | 1/2007 |
| WO | 2011-126328 A3 | 10/2011 |

* cited by examiner

*Primary Examiner* — Hung Lam
(74) *Attorney, Agent, or Firm* — Jefferson IP Law, LLP (57) ABSTRACT

A mobile device having a camera control system and a method of controlling a camera are provided. The camera control system determines a specific brightness value from at least one of a brightness value of a subject and a surrounding brightness value, and performs a camera setting to adjust exposure time and gain according to the determined specific brightness value.

19 Claims, 7 Drawing Sheets

CAMERA BRIGHTNESS CONTROL SYSTEM, MOBILE DEVICE HAVING THE SYSTEM, AND CAMERA BRIGHTNESS CONTROL METHOD

PRIORITY

This application claims the benefit under 35 U.S.C. §119 (a) of a Korean patent application filed on Jul. 9, 2012 in the Korean Intellectual Property Office and assigned Serial No. 10-2012-0074342, the entire disclosure of which is hereby incorporated by reference.

BACKGROUND OF THE INVENTION

1. Field of the Invention

The present invention relates to camera control technology. More particularly, the present invention relates to a camera control system, mobile device and method for allowing a much faster entry or transition into a camera-ready state by rapidly adjusting a camera setting value for an automatic brightness control of a camera.

2. Description of the Related Art

With a remarkable growth of related technologies, mobile devices are becoming increasing popular as a result of portability thereof. Particularly, mobile devices today outgrow their respective traditional fields and hence reach a mobile convergence stage in which a single mobile device has the ability to support various user functions.

Meanwhile, according to the related art, most recent mobile devices have a built-in camera module that provides a digital camera function. Users of such mobile devices may obtain an image of the subject for photography (e.g., capture an image) through a camera module and save the obtained (e.g., captured) image therein or send the obtained (e.g., captured) image to another device (e.g., another mobile device). According to the related art, a mobile device having a camera module performs an automatic brightness control function to adjust the brightness of the subject during photography (e.g., image capture). Therefore, even though a user does not adjust the brightness of an image, the user can take a photograph (e.g., capture an image) with suitable brightness.

With an automatic brightness control function invoked, a mobile device having a camera module collects dozens of frames so as to automatically adjust the brightness of the subject, evaluates the brightness of the collected frames, and determines whether such brightness agrees with a predetermined brightness. Thus, a mobile device according to the related art requires considerable time from the activation of a camera module to an entry into a camera-ready state capable of shooting. However, the considerable time from the activation of a camera module to an entry into the camera-ready state capable of shooting for mobile devices according to the related art often causes inconvenience to a user when the user desires to obtain an image of the instant that something happens. Namely, even if a user turns on a camera module so as to capture a specific instant, the user would be apt to miss the desired scene because a camera module takes too much time to enter into a camera-ready state. To solve this problem, a camera module may be maintained in a turn-on state. However, due to unnecessary power consumption, such a solution is not recommended in view of efficient use of a camera.

Therefore, a need exists for a mobile device and a method for allowing a much faster entry or transition into a camera-ready state. For example, a need exists for a mobile device and a method for allowing a much faster entry or transition into a camera-ready state by rapidly adjusting a camera setting value for an automatic brightness control of a camera.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, the present invention is to address the above-mentioned problems and/or disadvantages and to offer at least the advantages described below.

Another aspect of the present invention is to reduce time required for an entry into a camera-ready state and thereby to support rapid and suitable operation of a camera.

In accordance with an aspect of the present invention, a method of controlling a camera is provided. The camera control method includes determining a specific brightness value from at least one of a brightness value of a subject and a surrounding brightness value, and performing a camera setting to adjust exposure time and gain according to the determined specific brightness value.

In accordance with another aspect of the present invention, a camera control system is provided. The camera control system includes an illuminance sensor configured to collect at least one of a brightness value of a subject and a surrounding brightness value, and an automatic brightness controller configured to perform a camera setting to adjust exposure time and gain according to the brightness value collected by the illuminance sensor.

In accordance with another aspect of the present invention, a mobile device having a camera control system is provided. The mobile device includes an input unit configured to create an input signal for activating a camera function, an illuminance sensor configured to collect at least one of a brightness value of a subject and a surrounding brightness value when the camera function is activated, and a camera module configured to apply the collected brightness value to a camera setting for an automatic brightness control.

The above-discussed method, system and device allow a faster entry into a camera-ready state and also allow users to rapidly obtain a desired image with optimized brightness at a specific instant.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Furthermore, well known or widely used techniques, elements, structures, and processes may not be described or illustrated in detail to avoid obscuring the essence of the present invention. Although the drawings represent exemplary embodiments of the present invention, the drawings are not necessarily to scale and certain features may be exaggerated or omitted in order to better illustrate and explain the present invention.

Figure 1:
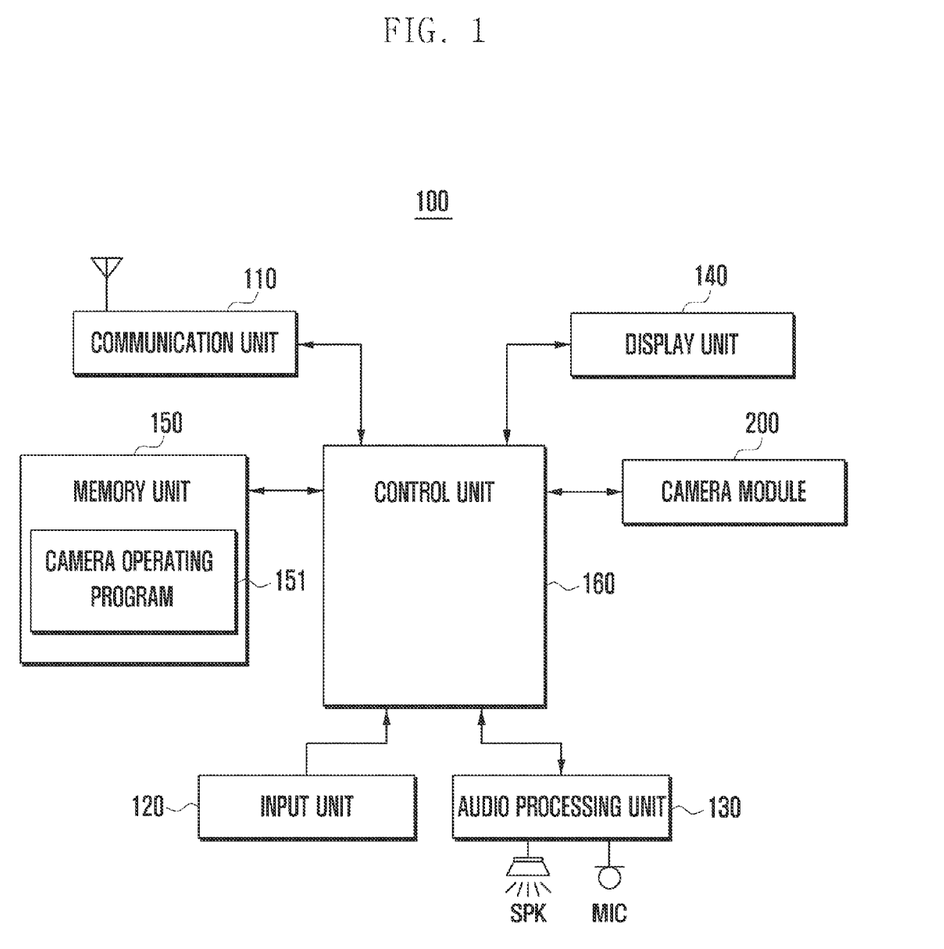
FIG. 1 is a block diagram illustrating a configuration of a mobile device having a camera control system according to an exemplary embodiment of the present invention.

FIG. 1 is a block diagram illustrating the configuration of a mobile device having a camera control system according to an exemplary embodiment of the present invention.

Referring to FIG. 1, the mobile device 100 may include a communication unit 110, an input unit 120, an audio processing unit 130, a display unit 140, a memory unit 150, and a control unit 160. The mobile device 100 may also include a camera module 200 for supporting a camera function. If the mobile device 100 supports a camera function only, namely if the mobile device 100 does not support a communication function, the communication unit 110 may be omitted.

The mobile device 100 having the above configuration measures external brightness of the camera module 200 and thereafter applies the measured brightness to an initial camera setting value for activating functions of the camera module 200. As an example, the mobile device 100 may measure the external brightness by measuring a brightness value of the subject for photography or a surrounding brightness value, through a sensor. After the mobile device 100 applies the measured brightness (e.g., external brightness) to the initial camera setting value for activating functions of the camera module 200, the mobile device 100 acquires an image of the subject on the basis of the brightness-applied (e.g., adjusted), camera setting value, while the control unit 160 controls the camera module 200.

Additionally, the mobile device 100 may perform further automatic brightness control through brightness evaluation for an image acquired depending on the adjusted camera setting value.

Therefore, by adjusting a camera setting value required for an automatic brightness control function on the basis of only the measured brightness value, the mobile device 100 can support much faster activation of camera functions. For more precise automatic brightness control, the mobile device 100 may repeatedly perform a process of acquiring an image according to the adjusted camera setting value and thereafter adjusting again the camera setting value by comparing a brightness value of the acquired image with a predetermined value. Because the mobile device 100 according to exemplary embodiments of the present invention not only performs a camera setting process on the basis of a brightness value collected by a sensor, but also uses only minimum frames for automatic brightness control, minimizing (e.g., reducing) time required for an entry into a camera-ready state is possible.

As discussed above, according to exemplary embodiments of the present invention, the communication unit 110 is optional. Namely, the communication unit 110 is included in the mobile device 100 that supports a communication function, but not included in the mobile device 100 that fails to support a communication function. For example, the communication unit 110 may be included in a mobile device 100 which performs communication with other devices or communication networks. However, exemplary embodiments of the present invention may correspond to a mobile device 100 (e.g., a standalone camera) that does not perform communication with other devices or communication networks.

According to exemplary embodiments of the present invention, for supporting a communication function of the mobile device 100, the communication unit 110 establishes a communication channel with a base station, receives information from the outside in response to user's control or predetermined schedule information, and transmits information stored in or collected by the mobile device 100 to the outside.

Additionally, the communication unit 110 may be formed of a communication module that supports a short-range communication function. In such a case, the communication unit 110 establishes a short-range communication channel with another mobile device, and transmits stored images to the other mobile device (e.g., the mobile device to which the mobile device 100 is connected via short-range communication). The communication unit 110 may receive, from any specific external server or another mobile device, an application table that includes camera setting values associated with brightness values measured depending on characteristics of the camera module 200. In addition, the communication unit 110 may receive update information for the application table. The aforesaid application table may be stored in the memory unit 150 when the mobile device 100 is fabricated.

The input unit 120 is configured to create a variety of input signals required for the operation of the mobile device 100. The input unit 120 may be formed of various input devices such as a keyboard, a keypad, a key button, and the like. Additionally, if the display unit 140 is provided in the form of a touch screen, the input unit 120 may be formed of a touch map that is virtually outputted on the touch screen. Particularly, the input unit 120 may have a camera shutter key, a camera setting key, a function key for saving, deleting, or processing images taken by a camera, and the like. The keys may be formed of hardware keys and may be disposed on the front or lateral side of the mobile device 100. If the display unit 140 is provided in the form of a touch screen, such keys may be formed of a virtual touch map on the display unit 140. The input unit 120 may create various input signals associated with a camera control through key manipulation and then transmit the input signals to the control unit 160. The input unit 120 may create an input signal for turning on or off an automatic brightness control function after turning on a camera in response to user's control.

The audio processing unit 130 may include a speaker (SPK) for outputting audio data associated with the operation of the mobile device 100, audio data associated with playback of an audio file stored in the memory unit 150, and audio data received from the outside. The audio processing unit 130 may support an audio data collecting function. For example, in order to support the audio data collecting function, the audio processing unit 130 may include a microphone (MIC). Audio data outputted by the audio processing unit 130 may include various sound effects associated with a camera control. Audio data collected by the MIC may include an audio signal collected during a video recording. If the mobile device 100 supports a communication function, the MIC may collect voice signals for the communication function.

The display unit 140 is configured to provide various screens required for the operation of the mobile device 100. For example, the display unit 140 may provide an initial screen, a menu screen, a camera control screen, a camera operation screen, a camera setting screen, and the like. When an input signal for activating the camera module 200 is received, the display unit 140 may output standby time information that indicates a camera-ready time resulting from completion of automatic brightness control. The standby time information allows a user to know how long the user will have to wait before the camera is in a camera-ready state and able to capture images, so that a user can plan a suitable shooting time. For example, the mobile device 100 outputs the standby time information as an indication as to a time at which the camera is available for use.

The memory unit 150 may store a basic operating system and various programs required for the operation of the mobile device 100. In addition, the memory unit 150 may store data, applications, algorithms, and the like associated with various user functions. Particularly, the memory unit 150 may store a camera operating program 151 for supporting a camera control function.

The camera operating program 151 may include a variety of routines required for the operation of the mobile device 100. For example, the camera operating program 151 may include a routine for controlling a sensor to collect a brightness value of the subject or a surrounding brightness value when the camera module 200 is turned on, and a routine for signal-processing the collected brightness value and applying the processed signal to a camera setting value for an automatic brightness control function.

Additionally, the camera operating program 151 may include a routine for evaluating the brightness of an image obtained on the basis of a camera setting value to which a measured brightness value is applied, a routine for comparing the evaluated brightness with a predetermined value, and a routine for adjusting a camera setting value according to the result of the comparison and then supporting the acquisition of images on the basis of the adjusted camera setting value. Further, the camera operating program 151 may include a routine for completing automatic brightness control if the adjusted setting value is identical to a predetermined value, and for then entering into a camera-ready state with a preview image activated.

Alternatively, the camera operating program 151 may not include the aforesaid routines of evaluation and comparison. For example, the camera operating program 151 may configure a camera setting value on the basis of a measured brightness value and then immediately complete automatic brightness control. In this case, an entry into a camera-ready state is relatively faster because evaluation and comparison of additional frames for further brightness adjustment is not required.

Meanwhile, the memory unit 150 may store an application table for camera setting values. The application table may contain camera setting values according to measured brightness values. An automatic brightness controller 260 which will be described later may refer to the application table stored in the memory unit 150, so that a specific camera setting value suitable for certain surrounding brightness can be offered on the basis of the application table.

Additionally, the camera operating program 151 may further include a routine for acquiring an image after the completion of automatic brightness control and for then processing the acquired image, a routine for saving the processed image or for outputting the processed image to the display unit 140, and a routine for outputting an automatically brightness-adjusted preview image of the subject to the display unit 140. The camera operating program 151 is loaded on the control unit 160 when the camera module 200 is activated, and selected routines thereof are provided to the camera module 200 under the control of the control unit 160.

The control unit 160 is configured to control the flow of signals required for the operation of the mobile device 100 and to control collection and output of information. Particularly, the control unit 160 performs various signal controls associated with a camera control, especially, a signal control associated with an automatic brightness control.

If an illuminance sensor is located at the inside of the camera module 200, the control unit 160 may transfer the authority for automatic brightness control to the camera module 200. The control unit 160 may control saving or output of an image obtained and processed by the camera module 200. If the illuminance sensor is located at the outside of the camera module 200, the control unit 160 may activate the illuminance sensor in response to a request for activating the camera module 200, and may then provide brightness values collected by the illuminance sensor to the camera module 200. In addition, the control unit 160 may receive, from the camera module 200, information about a delay time resulting from the automatic brightness control of the camera module 200, and may then output the received delay time information in a predetermined form of an image, a popup window, a text, or the like.

The camera module 200 is configured to support a camera function of the mobile device 100. As an example, the camera module 200 may collect a brightness value of the subject or a surrounding brightness value by using an illuminance sensor located therein or at a certain place of the mobile device 100, and may then control the automatic brightness control on the basis of the collected brightness value.

Figure 2:
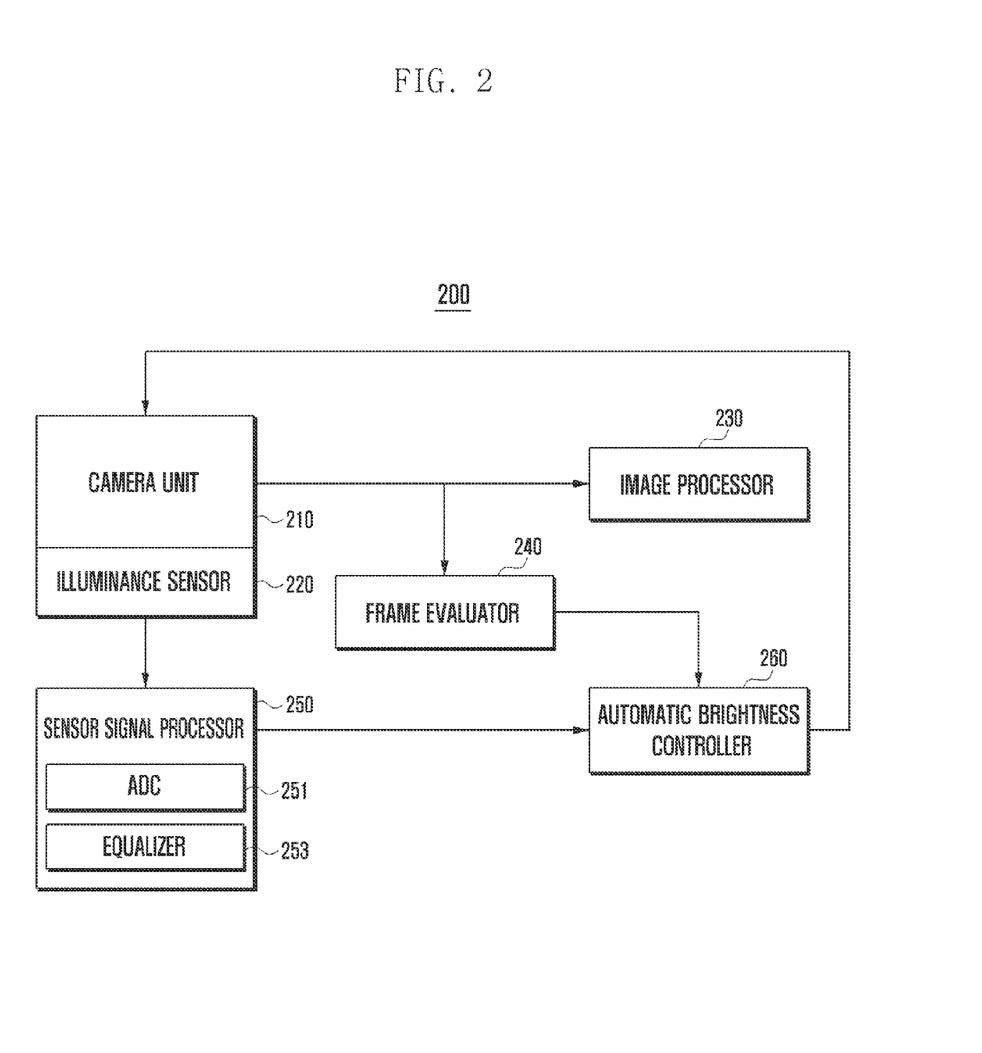
FIG. 2 is a block diagram illustrating a configuration of a camera module according to an exemplary embodiment of the present invention.

FIG. 2 is a block diagram illustrating a configuration of a camera module according to an exemplary embodiment of the present invention.

Referring to FIG. 2, the camera module 200 includes a camera unit 210, an illuminance sensor 220, an image processor 230, a frame evaluator 240, a sensor signal processor 250, and an automatic brightness controller 260. Although not shown in FIG. 2, the camera module 200 may further include at least one power supply unit for supplying power required for driving the camera unit 210 and the illuminance sensor 220.

Additionally, although not shown in FIG. 2, the camera module 200 may further include some elements capable of performing various kinds of image processing prior to the image processor 230. For example, the camera module 200 may include a black level compensation unit for compensating a black level of an acquired image, a digital gain unit for regulating digital type gain, a lens shading correction unit for correcting a distortion caused by a lens, a color interpolation unit for correcting a color, a white balance gain unit for regulating gain for a white balance, a gamma control unit, a hue/saturation static unit, and/or the like. Although the following description regarding the camera module 200 is focused on elements related to automatic brightness control, the camera module 200 may further include any other element for various compensation and correction functions.

The camera unit 210 may include a lens, an aperture, a sensor array, and the like. The camera unit 210 acquires an image of the subject formed on the sensor array through the lens when the aperture, which determines exposure time, opens. Thereafter, the camera unit 210 transmits the acquired image to the image processor 230. Specifically, the sensor array has a great number of sensors that correspond to pixels, and the camera unit 210 acquires an image of the subject by the sensor array that collects light received through the lens. The camera unit 210 acquires an image of the subject, based on a predetermined brightness value. The camera unit 210 may perform an automatic brightness control function by using a camera setting value transmitted from the automatic brightness controller 260 on the basis of a measured brightness value, and may acquire an image by using the camera setting value. In addition, the camera unit 210 may acquire an image, based on a camera setting value determined depending on surrounding brightness value information under the control of the automatic brightness controller 260, and may transmit the acquired image to the image processor 230.

The illuminance sensor 220 corresponds to a sensor that collects at least one of a brightness value of the subject and a surrounding brightness value so as to calculate a camera setting value. If the illuminance sensor 220 is located at the inside of the camera module 200, the illuminance sensor 220 may be disposed around the sensor array. Information about a brightness value collected by the illuminance sensor 220 may be transmitted to the automatic brightness controller 260 through the sensor signal processor 250 after gain thereof is variably amplified by a variable gain amplifier.

Meanwhile, the illuminance sensor 220 disposed around the sensor array can collect a brightness value similar to that of an image acquired by the sensor array by collecting a brightness value of or around the subject. Because the mobile device 100 collects a brightness value similar to that of an image acquired through the camera unit 210, providing brightness value information for more exact automatic brightness control is possible. Alternatively, even though the evaluation of a brightness value is further performed, the total number of image frames required for automatic brightness control is still relatively small.

The illuminance sensor 220 may be disposed at the outside of the camera module 200. In this case, a brightness value collected by the illuminance sensor 220 corresponds to an external brightness value of the mobile device 100, and may be transmitted to the sensor signal processor 250 through a sensor variable gain regulator. The brightness value collected by the illuminance sensor 220 disposed at the outside of the camera module 200 may also be used as a camera setting value for an automatic brightness control function.

The image processor 230 is configured to perform an image processing for an image acquired by the camera unit 210. The image processor 230 may modify an image acquired by the camera unit 210 to an image having a specific size and pixel displayable on the display unit 140. The image processor 230 may modify the acquired image to an image having a specific size and pixel storable in the memory unit 150. For example, the image processor 230 not only processes an image obtained by the sensor array of the camera unit 210 to a suitable form for being displayed on the display unit 140, but the image processor 230 also converts the image obtained by the sensor array into a suitable form for being stored in the memory unit 150.

An image processed by the image processor 230 may be outputted, in the form of preview image, to the display unit 140 and selectively saved in the memory unit 150. The preview image or saved image may correspond to an image acquired using a camera setting value to which surrounding brightness value information is applied. As an example, a preview image or saved image may correspond to an image acquired with a camera setting value to which only brightness value information measured by the illuminance sensor 220 is applied. As another example, a preview image or saved image may correspond to an image acquired with a camera setting value that passes through automatic brightness control by means of frame evaluation.

The frame evaluator 240 is configured to evaluate, for automatic brightness control, some frames of an image acquired by the camera unit 210. The frame evaluator 240 may calculate brightness values of a certain image acquired by the camera unit 210 and may then transmit the calculated brightness values to the automatic brightness controller 260. The evaluation of images by the frame evaluator 240 may be repeatedly performed until the result of evaluation becomes identical to a predetermined value or has a predetermined similarity. Because a camera setting value corresponding to a brightness value measured by the illuminance sensor 220 is applied to the evaluation of images, a brightness value of an acquired image will be probably similar to a predetermined value. Therefore, the number of images evaluated by the frame evaluator 240 can be reduced.

The sensor signal processor 250 is configured to perform a signal processing of brightness value information collected by the illuminance sensor 220 so as to transmit the brightness value information to the automatic brightness controller 260. The sensor signal processor 250 may have an Analog-to-Digital Converter (ADC) 251 and an equalizer 253 which are used for processing signals collected by the illuminance sensor 220 and which are then amplified by the variable gain amplifier. The ADC 251 is configured to convert analog signals, which are an output of the variable gain amplifier, into digital signals and to transmit the digital signals to the equalizer 253. The equalizer 253 converts the digital signals received from the ADC 251 into equalized signals and then transmits the equalized signals to the automatic brightness controller 260.

The automatic brightness controller 260 is configured to analyze, through signals received from the sensor signal processor 250, a brightness value collected by the illuminance sensor 220. The automatic brightness controller 260 creates a camera setting value corresponding to brightness value information and uses the camera setting value for controlling the camera unit 210.

The brightness adjustment of the camera module 200 depends on at least two factors: an open ratio of the aperture and an ISO size. If a brightness value of the subject or a surrounding brightness value is greater than a given threshold, an acquired image may undesirably contain excessive light due to overexposure. In contrast, if such a brightness value is smaller than a given threshold, an excessively dark image may be obtained due to less exposure. Therefore, there is a need to automatically adjust a brightness value in order to obtain a good image. Exemplary embodiments of the present invention check (e.g., determine) the degree of surrounding brightness values and then automatically applies the degree of surrounding brightness values to an image, thus allowing a faster acquisition of a high-quality image.

The above-discussed camera control system collects information about at least one of a brightness value of the subject and a surrounding brightness value through the illuminance sensor 220 and, based on such a brightness value, calculates a camera setting value for the operation of the camera unit 210. This camera setting value may be an aperture value and an ISO value. If overexposure due to excessive light is estimated through brightness value information transmitted by the illuminance sensor 220, the automatic brightness controller 260 reduces aperture open time and/or ISO so as to prevent an overexposure state. In case of an overexposure state, the automatic brightness controller 260 reduces first ISO to adjust brightness. If it is difficult to reduce ISO, the automatic brightness controller 260 may adjust brightness through aperture control.

In case of less exposure, the automatic brightness controller 260 adjusts first an open ratio of aperture, and if further adjusting the aperture is difficult, the automatic brightness controller 260 may adjust ISO. Then the automatic brightness controller 260 transmits, to the camera unit 210, a camera setting value that corresponds to the above-discussed adjustment of aperture and ISO. The camera unit 210 that receives a camera setting value from the automatic brightness controller 260 can perform automatic brightness control through adjustment of aperture and ISO based on the received camera setting value. Then the camera unit 210 acquires an image.

After an image is acquired according to a camera setting value created on the basis of brightness value information transmitted by the illuminance sensor 220, the frame evaluator 240 performs the evaluation of a brightness value for the acquired image and then transmits the result of the evaluation of the brightness value to the automatic brightness controller 260. Then the automatic brightness controller 260 determines whether a brightness value of an image received from the frame evaluator 240 corresponds to a predetermined value. If a brightness value of the received image does not correspond to a predetermined value, the automatic brightness controller 260 decreases or increases a camera setting value and returns the camera setting value to the camera unit 210. Consequently, the automatic brightness controller 260 obtains a surrounding brightness value or a subject brightness value through the illuminance sensor 220 and applies the surrounding brightness value or the subject brightness value to a camera setting value such that the camera setting value approaches to a predetermined setting value for preventing both overexposure and less exposure.

Meanwhile, after performing, at least once, the above-discussed process of applying a surrounding brightness value or a subject brightness value to a camera setting value, the automatic brightness controller 260 may perform, at least once, a process of correcting a camera setting value according to the evaluation of a brightness value by the frame evaluator 240. However, depending on a system design, the automatic brightness controller 260 may perform only a process of applying a surrounding brightness value or a subject brightness value to a camera setting value without performing any additional frame evaluation and subsequent camera setting correction. Additionally, for the above process of applying the surrounding brightness value or the subject value to a camera setting value, the automatic brightness controller 260 may utilize an application table that includes at least one factor of aperture and ISO values regarding each brightness value. An image obtained using a camera setting value to which a surrounding brightness value or a subject brightness value is applied may be a preview image or a captured image.

As discussed above, according to exemplary embodiments of the present invention, the mobile device 100 provides, based on brightness value information collected through the illuminance sensor 220, a camera setting value for an image acquired by the camera unit 210. Therefore, the mobile device 100 adjusts image acquisition environments of the camera unit 210 on the basis of brightness value information matched to current image acquisition environments, thus supporting faster automatic brightness control. While a technique according to the related art requires dozens of frames so as to suitably adjust brightness, exemplary embodiments of the present invention merely require a few frames for automatic brightness control or realize automatic brightness control without any evaluation of additional frame. Thus, exemplary embodiments of the present invention can reduce (e.g., minimize) time required for automatic brightness control. For example, exemplary embodiments of the present invention may reduce (e.g., minimize) time required for entry of the camera module 200 into a camera-ready state.

FIGS. 3A to 3D are diagrams illustrating examples of various arrangements of illuminance sensors according to an exemplary embodiment of the present invention.

Figure 3A:
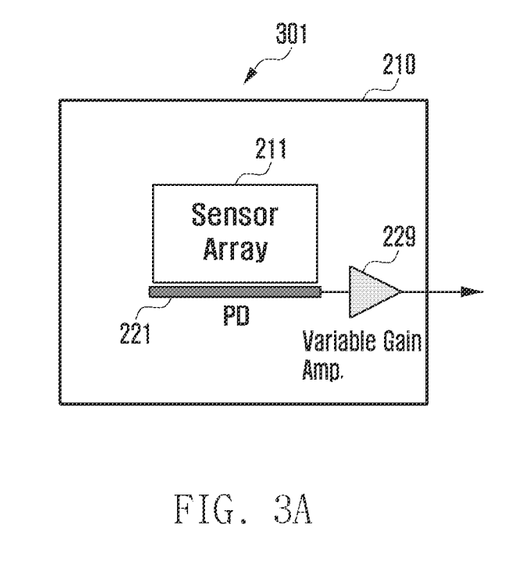
FIGS. 3A to 3D are diagrams illustrating examples of various arrangements illuminance sensors according to an exemplary embodiment of the present invention.

Referring to FIG. 3A, the illuminance sensor 220 may be disposed in the form of a photodiode (PD) 221 at the bottom of a sensor array 211 of the camera unit 210 as indicated by a reference numeral 301. The photodiode 221 is connected to a variable gain amplifier 229, collects brightness value information under the control of the automatic brightness controller 260, and transmits brightness value information to the variable gain amplifier 229. Then the variable gain amplifier 229 delivers the variably amplified brightness value information to the sensor signal processor 250.

Figure 3B:
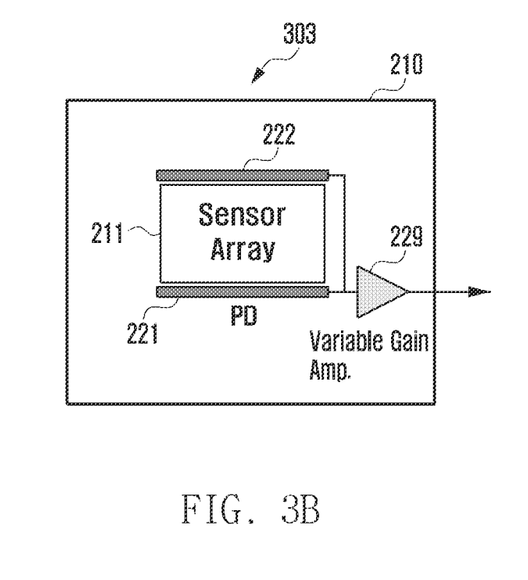

Referring to FIG. 3B, the illuminance sensor 220 may have the first photodiode 221 and a second photodiode 222 which are respectively disposed at the bottom and top of the sensor array 211 of the camera unit 210, as indicated by a reference numeral 303. Each of the first and second photodiodes 221 and 222 is connected to the variable gain amplifier 229. When a signal for collecting brightness values is received from the automatic brightness controller 260, the first and second photodiodes 221 and 222 detect a surrounding brightness value or a brightness value of the subject and then transmits brightness value information to the variable gain amplifier 229.

Figure 3C:
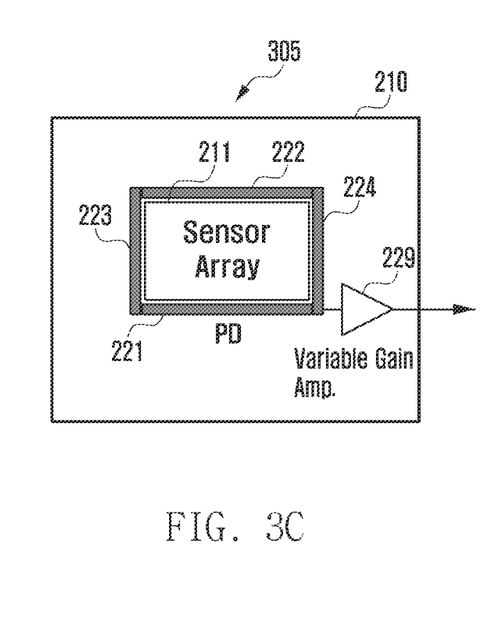

Referring to FIG. 3C, the illuminance sensor 220 may have a first photodiode 221, a second photodiode 222, a third photodiode 223, and a fourth photodiode 224 which are respectively disposed at the bottom, top, left and right of the sensor array 211 of the camera unit 210, as indicated by a reference numeral 305. The first to fourth photodiodes 221 to 224 are connected to the variable gain amplifier 229, and output of the variable gain amplifier 229 is transmitted to the sensor signal processor 250.

As illustrated in FIGS. 3A to 3C, the illuminance sensor 220 is disposed around the sensor array 211 at the inside of the camera unit 210. However, such a disposition of the illuminance sensor 220 relative to the sensor array 211 is merely an illustrative example and is not to be considered as a limitation of the present invention.

Figure 3D:
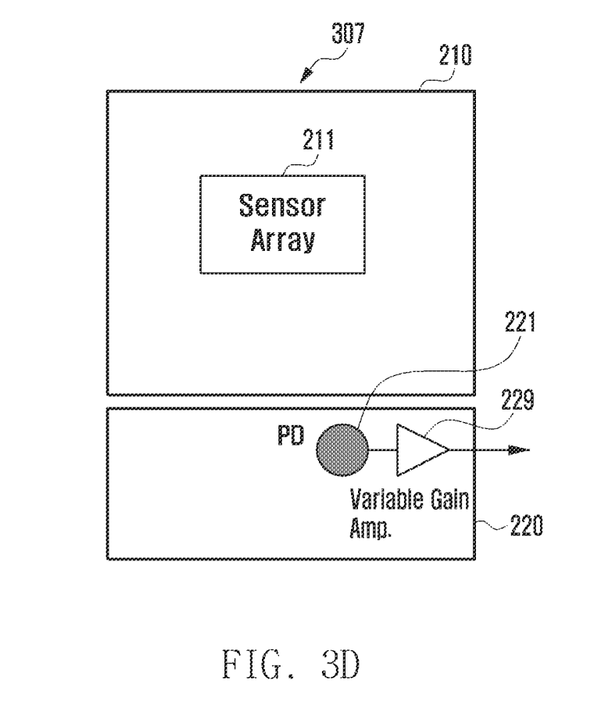

Referring to FIG. 3D, as indicated by a reference numeral 307, the illuminance sensor 220 may be disposed at the outside of the camera unit 210 comprising a sensor array 211. In this case, the illuminance sensor 220 may be disposed at a certain place in the mobile device 100, and may employ a preexisting illuminance sensor. The illuminance sensor may include a photodiode 221 and a variable gain amplifier 229. Alternatively, although not illustrated in FIG. 3A to 3D, any combination of the above-discussed internal type and external type may be used. In this case, the automatic brightness controller 260 may refer to all of brightness values collected from the internal and external illuminance sensors 220.

An ideal arrangement of the illuminance sensor 220 is to measure a brightness value of or around the subject. Therefore, by disposing the illuminance sensor 220 around the sensor array 211 of the camera unit 210, and enabling the illuminance sensor 220 to measure a brightness value of the subject, improving (e.g., optimizing) a camera setting value for an automatic brightness control is possible. However, a new arrangement of the illuminance sensor 220 may incur additional cost. Therefore, an effective and alternative solution is to collect a surrounding brightness value, instead of a brightness value of the subject, by using the existing illuminance sensor of the mobile device 100.

Although the above discussion is focused on a configuration in which the mobile device 100 has a single camera module 200, such a configuration is merely an illustrative example and is not to be considered as a limitation of the present invention. For example, the mobile device 100 may have two camera modules. The first camera module may be used for capturing a photograph and the second camera module be used for performing a video call. In this case, the mobile device 100 may have the illuminance sensors 220 disposed respectively at the first and second camera modules. If one of two camera modules is activated, the mobile device 100 controls the corresponding illuminance sensors 220 to collect brightness value information.

According to exemplary embodiments of the present invention, only one illuminance sensor 220 may be used together with the above camera modules. For example, the illuminance sensor 220 may be used no matter which camera module is activated. In this case, if the illuminance sensor 220 is disposed only at the first camera module, and an input signal for performing a video call is received, the control unit 160 may use the illuminance sensor 220 of the first camera module so as to adjust a camera setting value of the second camera module. In contrast, if the illuminance sensor 220 is disposed only at the second camera module, and an input signal for capturing a photograph is received, the control unit 160 may use the illuminance sensor 220 of the second camera module so as to adjust a camera setting value of the first camera module.

Figure 4:
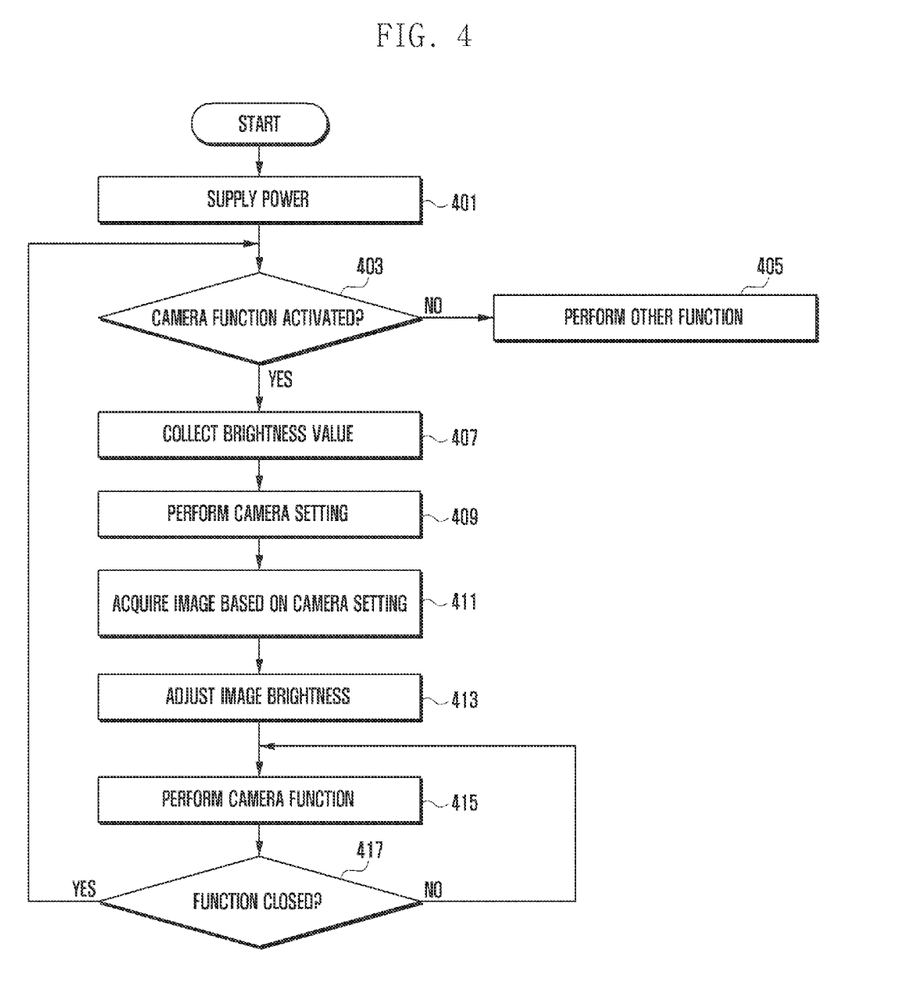
FIG. 4 is a flow diagram illustrating a camera control method according to an exemplary embodiment of the present invention.

FIG. 4 is a flow diagram illustrating a camera control method according to an exemplary embodiment of the present invention.

Referring to FIG. 4, at step 401, the mobile device 100 performs a power supply process. The control unit 160 delivers power, supplied from a power source, to the input unit 120, the display unit 140, and the like such that the mobile device 100 keeps an operating state.

When an input signal is received from either the input unit 120 or the display unit 140 having an input function, at step 403, the control unit 160 determines whether the received input signal corresponds to an input signal for activating a camera function. If the control unit 160 determines that the received input signal does not correspond to an input signal for activating a camera function at step 403, then the control unit may proceed to step 405 at which the control unit 160 may perform a particular function of the mobile device 100 in response to the input signal. For example, the control unit 160 may perform a function to search for stored images, a function to selectively edit or delete stored images, a function to selectively transmit stored images to other device, and the like.

In contrast, if the control unit 160 determines that the received input signal corresponds to an input signal for activating a camera function at step 403, then the control unit proceeds to step 407 at which the control unit 160 controls a process of collecting a surrounding brightness value or a brightness value of the subject. Specifically, if the illuminance sensor 220 is located at the outside of the camera module 200, the control unit 160 may directly control the illuminance sensor 220 to collect a brightness value. If the illuminance sensor 220 is located at the inside of the camera module 200, the control unit 160 may transmit a control signal to the automatic brightness controller 260 of the camera module 200 such that the automatic brightness controller 260 may collect a brightness value through the illuminance sensor 220. In response to the control signal, the illuminance sensor 220 may collect a brightness value and deliver the brightness value to the automatic brightness controller 260.

At step 409, the automatic brightness controller 260 applies brightness value information, received from the illuminance sensor 220, to a camera setting value and then delivers the camera setting value to the camera unit 210. A camera setting value may include exposure time and gain, namely, an open ratio of the aperture and an ISO size. A relation between a brightness value versus exposure time and gain is shown in FIG. 5.

Figure 5:
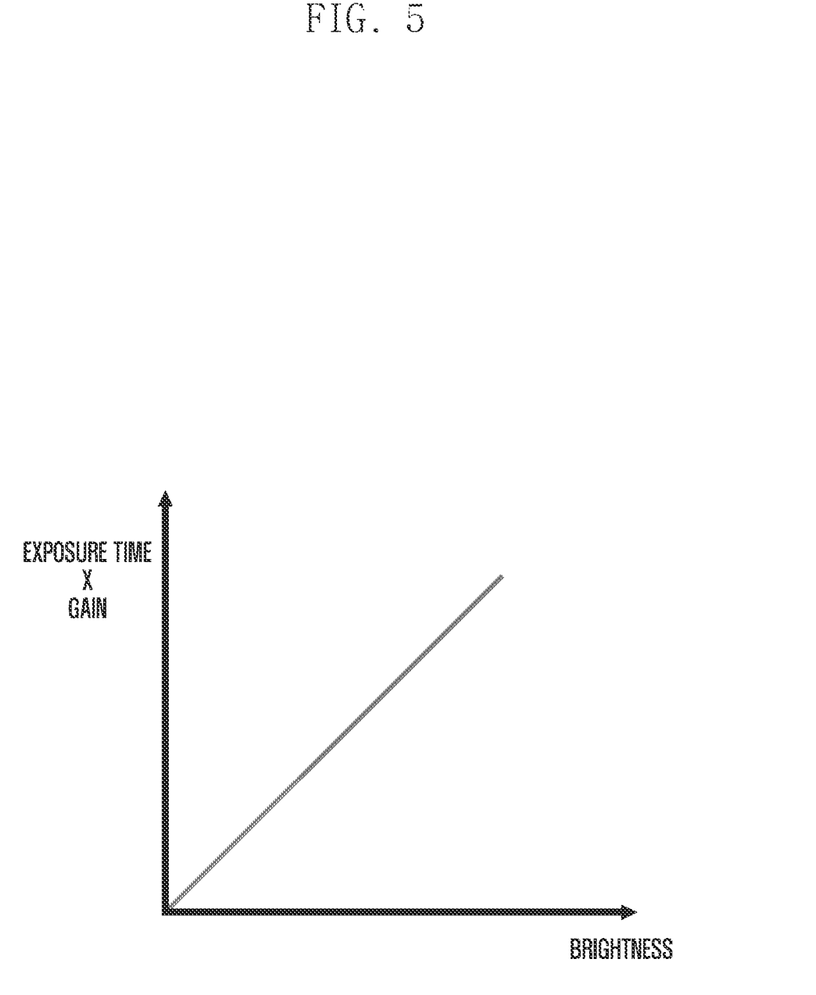
FIG. 5 is a graph illustrating a relation between brightness versus exposure time and gain according to an exemplary embodiment of the present invention.

FIG. 5 is a graph illustrating a relation between brightness versus exposure time and gain according to an exemplary embodiment of the present invention.

Referring to FIG. 5, brightness is proportional to the product of exposure time and gain. For example, the product of exposure time and gain will increase as brightness rises, and will decrease as brightness drops. Camera setting values regarding respective brightness values may be predefined and recorded in the application table. By using the application table, the automatic brightness controller 260 may control a setting process for the camera unit 210.

If surrounding brightness or brightness of the subject is greater than a predetermined value, the automatic brightness controller 260 decreases exposure time or gain such that an image of the subject obtained by the camera unit 210 may agree with a predetermined value. In contrast, if surrounding brightness or brightness of the subject is smaller than a predetermined value, the automatic brightness controller 260 increases exposure time or gain such that an image of the subject obtained by the camera unit 210 may agree with a predetermined value. As discussed above, in order to increase the brightness, the automatic brightness controller 260 may adjust the exposure time first because adjustment of gain (e.g., adjustment of ISO), may invite an increase in image noise. However, if exposure time is greater than a given value, an image may become unstable due to too much exposure time. Therefore, in this case, the automatic brightness controller 260 may adjust ISO. Meanwhile, in order to decrease the brightness, the automatic brightness controller 260 may adjust the gain first.

At step 411, the camera unit 210 acquires an image of the subject on the basis of exposure time and gain defined as a camera setting value, and transmits the acquired image to the frame evaluator 240. Thereafter, the frame evaluator 240 extracts brightness information from the acquired image and determines whether the brightness of the acquired image agrees with a predetermined value. The predetermined value corresponds to a specific value or range that is defined in advance so as to prevent both overexposure and under (or less) exposure. This value or range may rely upon optical process characteristics of the camera module and also may be experimentally determined.

Meanwhile, after the frame evaluator 240 extracts brightness information from the acquired image and transmits the brightness information to the automatic brightness controller 260, the automatic brightness controller 260 compares the extracted brightness information with a predefined value. If a difference between the extracted brightness information and the predefined value is beyond a permissible range, then at step 413, the automatic brightness controller 260 adjusts a camera setting value to control an image acquisition of the camera unit 210. Namely, if the extracted brightness information is smaller than a predetermined value (e.g., in case of having dark surroundings), the automatic brightness controller 260 increases at least one of exposure time and gain included in a camera setting value in order to increase brightness. Under the control of the automatic brightness controller 260, the frame evaluator 240 may repeatedly perform a process of extracting the brightness information from the acquired image and then adjusting brightness by optimizing a camera setting value.

After adjustment of image brightness, at step 415, the automatic brightness controller 260 performs a camera function. For example, the automatic brightness controller 260 acquires an image of the subject in response to a shutter input. At this step, the automatic brightness controller 260 may output information indicating the completion of automatic brightness control. For example, the automatic brightness controller 260 may output information indicating a status of the camera function.

At step 417, the control unit 160 determines whether the camera function is terminated or closed. If the control unit 160 determines that the camera function is closed, then the control unit 160 returns to step 403. Otherwise, if the control unit determines that the camera function is not closed, then the control unit returns to step 415.

Figure 6:
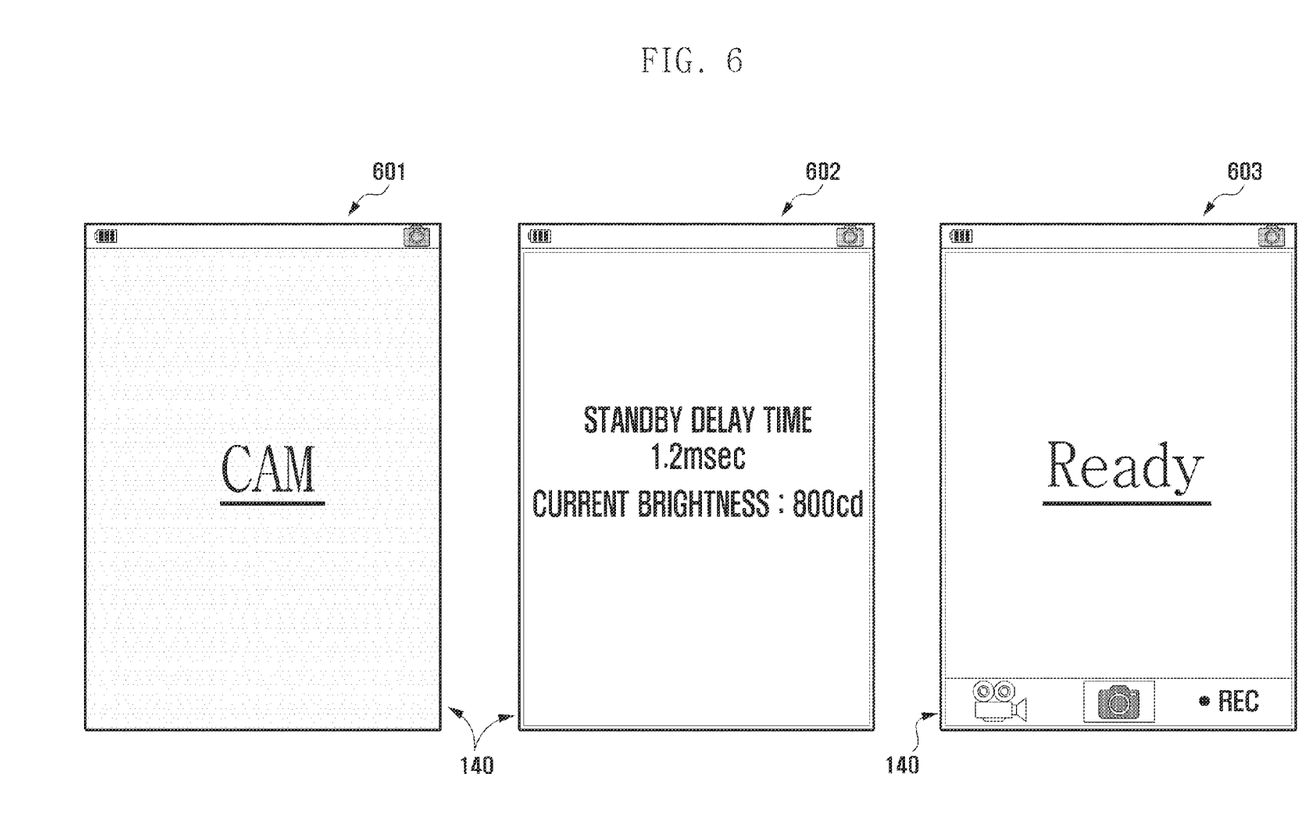
FIG. 6 shows screen interfaces for supporting a camera control system according to an exemplary embodiment of the present invention.

FIG. 6 shows screen interfaces for supporting a camera control system according to an exemplary embodiment of the present invention.

Referring to FIG. 6, as illustrated in screenshot 601, the automatic brightness controller 260 may output information or otherwise show an initial state prior to activation of a camera function on the display unit 140.

As illustrated in screenshot 602, the automatic brightness controller 260 may output information indicating standby delay time information on the display unit 140. The standby delay time information may correspond to a difference between a predetermined value and brightness information extracted from an image acquired on the basis of a camera setting value.

As illustrated in screenshot 603, the automatic brightness controller 260 may output information indicating a camera-ready state on the display unit 140.

According to exemplary embodiments of the present invention, steps of brightness evaluation by the frame evaluator 240 and additional adjustment of camera setting value by the automatic brightness controller 260 may be omitted. For example, exemplary embodiments of the present invention further allow an automatic brightness control based on only the brightness information collected by the illuminance sensor 220. In this case, without brightness evaluation for the acquired image and additional adjustment of camera setting value, the camera module 200 immediately enters into a camera-ready state with a preview image activated.

As discussed above, an automatic brightness control function of this invention uses information about a surrounding brightness value in order to adjust a camera setting value, thus avoiding undesirable states in which unnecessary and excessively lower or higher camera setting value is applied. Namely, by applying a camera setting value on the basis of brightness value information that reflects actual image acquisition environments, exemplary embodiments of the present invention not only allow the acquisition of an image with an optimal brightness value, but also minimize the number of times to evaluate brightness information in order to adjust brightness. As a result, exemplary embodiments of the present invention can reduce (e.g., minimize) time required for automatic brightness control. For example, the time required for an entry into a camera-ready state may be minimized.

The above-discussed mobile device 100 may essentially or selectively include any other module or element. For example, the mobile device 100 may further include a short range communication module, a wired or wireless data transmission interface, an Internet access module, a digital broadcast receiving module, and the like. According to a digital convergence tendency today, such elements may be varied, modified and improved in various ways, and any other elements equivalent to the above elements may be additionally or alternatively equipped in the mobile device 100. Meanwhile, as will be understood by those skilled in the art, some of the above-mentioned elements in the mobile device 100 may be omitted or replaced with another.

Additionally, according to exemplary embodiments of the present invention, the mobile device 100 may include or otherwise correspond to various types of electronic devices. For example, the mobile device 100 may include portable devices, multimedia players and corresponding application equipment, especially including mobile communication terminals based on various communication protocols, a Portable Multimedia Player (PMP), a digital broadcasting player, a Personal Digital Assistant (PDA), a music player (e.g., an MP3 player), a portable game console, a smart phone, a notebook, a handheld Personal Computer (PC), a tablet PC, a laptop PC, a handheld e-book, and the like.

It will be appreciated that exemplary embodiments of the present invention according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing apparatus or a method as claimed in any one of the claims of this specification and a machine-readable storage storing such a program.

While this invention has been shown and described with reference to certain exemplary embodiment thereof, it will be understood by those skilled in the art that various changes in form and details may be made therein without departing from the spirit and scope of the invention as defined by the appended claims and their equivalents.

What is claimed is:

1. A method of controlling a camera, the method comprising:
   determining a specific brightness value from at least one of a brightness value of a subject and a surrounding brightness value;
   performing a camera setting to adjust exposure time and gain according to the determined specific brightness value;
   acquiring an image of the subject on the basis of the adjusted exposure time and the adjusted gain; and
   adjusting the camera setting value after comparing brightness information of the acquired image with a predetermined value.

2. The method of claim 1, wherein the determining of the specific brightness value includes at least one of:
   collecting a brightness value of or around the subject using an illuminance sensor; and
   collecting a brightness value around a mobile device using the illuminance sensor.

3. The method of claim 1, further comprising:
   calculating a standby delay time from a difference between the brightness information and the predetermined value; and
   outputting the standby delay time.

4. The method of claim 1, wherein the adjusting of the camera setting value includes:
   increasing brightness defined in the camera setting value if the brightness information of the acquired image is less than the predetermined value; and
   decreasing the brightness defined in the camera setting value if the brightness information of the acquired image is greater than the predetermined value.

5. The method of claim 4, wherein the adjusting of the camera setting value includes:
   adjusting the exposure time in order to increase the brightness defined in the camera setting value; and
   adjusting the gain in order to decrease the brightness defined in the camera setting value.

6. A camera control system comprising:
   a camera unit configured to acquire an image of the subject on the basis of the camera setting;
   an illuminance sensor configured to collect at least one of a brightness value of a subject and a surrounding brightness value; and
   an automatic brightness controller configured to:
   perform a camera setting to adjust exposure time and gain according to the brightness value collected by the illuminance sensor, and
   adjust the camera setting value after comparing brightness information of the acquired image by the adjusted camera setting with a predetermined value.

7. The system of claim 6, further comprising:
   a camera unit configured to acquire an image of the subject on the basis of the camera setting.

8. The system of claim 7, further comprising:
   a frame evaluator configured to evaluate brightness information of the image acquired by the camera unit and then to provide the brightness information to the automatic brightness controller,
   wherein the automatic brightness controller is further configured to perform an automatic brightness control based on a comparison of the brightness information with a predetermined value.

9. The system of claim 6, further comprising:
   a display unit configured to output a standby delay time associated with a difference between the brightness information and the predetermined value.

10. The system of claim 6, wherein the automatic brightness controller is further configured to increase brightness defined in the camera setting if the brightness information of the acquired image is less than the predetermined value, and to decrease brightness defined in the camera setting if the brightness information of the acquired image is greater than the predetermined value.

11. The system of claim 10, wherein the automatic brightness controller is further configured to adjust the exposure time in order to increase the brightness defined in the camera setting, and to adjust the gain in order to decrease the brightness defined in the camera setting.

12. A mobile device having a camera control system, the mobile device comprising:
   an input unit configured to create an input signal for activating a camera function;
   an illuminance sensor configured to collect at least one of a brightness value of a subject and a surrounding brightness value when the camera function is activated; and
   a camera module configured to:
   apply the collected brightness value to a camera setting for an automatic brightness control,
   acquire an image of the subject on the basis of the adjusted exposure time and the adjusted gain, and
   adjust a camera setting value after comparing brightness information of the acquired image with a predetermined value.

13. The mobile device of claim 12, wherein the illuminance sensor is located at the inside of the camera module or at the outside of the camera module.

14. The mobile device of claim 12, wherein the camera module includes:
   an automatic brightness controller configured to calculate a camera setting value having exposure time and gain on the basis of the brightness value collected by the illuminance sensor, and to perform an automatic brightness control based on a comparison between brightness information of an acquired image and a predetermined value;
   a camera unit configured to acquire an image of the subject according to the camera setting value; and a frame evaluator configured to evaluate the brightness information of the image acquired by the camera unit, and to deliver the brightness information to the automatic brightness controller.

15. The mobile device of claim 14, wherein the illuminance sensor includes:
   at least one photodiode disposed at one or more of a bottom, a top, a left side and a right side of a sensor array equipped in the camera unit;
   a variable gain amplifier configured to variably amplify gain of an output signal of the at least one photodiode; and
   a sensor signal processor configured to convert output signals of the variable gain amplifier into digital signals, to convert the digital signals into equalized signals, and to transmit the equalized signals to the automatic brightness controller.

16. The mobile device of claim 14, wherein the automatic brightness controller is further configured to increase brightness defined in the camera setting if the brightness information of the acquired image is less than the predetermined value, and to decrease brightness defined in the camera setting if the brightness information of the acquired image is greater than the predetermined value.

17. The mobile device of claim 16, wherein the automatic brightness controller is further configured to adjust the exposure time in order to increase the brightness defined in the camera setting, and to adjust the gain in order to decrease the brightness defined in the camera setting.

18. The mobile device of claim 12, further comprising:
   a display unit configured to output a standby delay time associated with a difference between the brightness information and the predetermined value.

19. A non-transitory computer-readable storage medium storing instructions, that when executed, cause at least one processor to perform the method of claim 1.

* * * * *